(12) United States Patent
Gu

(10) Patent No.: US 11,570,823 B2
(45) Date of Patent: Jan. 31, 2023

(54) RANDOM ACCESS OCCASION INDICATION METHOD AND APPARATUS, RANDOM ACCESS OCCASION DETERMINATION METHOD AND APPARATUS, STORAGE MEDIUM, BASE STATION AND TERMINAL

(71) Applicant: SPREADTRUM COMMUNICATIONS (SHANGHAI) CO., LTD., Shanghai (CN)

(72) Inventor: Xiangxin Gu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 46 days.

(21) Appl. No.: 17/271,240

(22) PCT Filed: Jul. 18, 2019

(86) PCT No.: PCT/CN2019/096464
§ 371 (c)(1),
(2) Date: Feb. 25, 2021

(87) PCT Pub. No.: WO2020/042809
PCT Pub. Date: Mar. 5, 2020

(65) Prior Publication Data
US 2021/0329711 A1   Oct. 21, 2021

(30) Foreign Application Priority Data

Aug. 31, 2018 (CN) .......................... 201811011433.1

(51) Int. Cl.
*H04W 74/08* (2009.01)
*H04W 56/00* (2009.01)
*H04W 84/06* (2009.01)

(52) U.S. Cl.
CPC ...... *H04W 74/0841* (2013.01); *H04W 56/009* (2013.01); *H04W 74/0866* (2013.01); *H04W 84/06* (2013.01)

(58) Field of Classification Search
CPC ............. H04W 56/009; H04W 74/006; H04W 74/008; H04W 74/0833; H04W 74/0841;
(Continued)

(56) References Cited

U.S. PATENT DOCUMENTS 8,619,682 B2 * 12/2013 Park .................... H04W 72/042
370/347
2016/0174261 A1    6/2016 Yang et al.
(Continued)

FOREIGN PATENT DOCUMENTS

CN    102917468 A    2/2013
CN    106341899 A    1/2017
(Continued)

OTHER PUBLICATIONS

EPO Extended European Search report for corresponding to EP Application No. 19854037.9; dated Apr. 26, 2022.
(Continued)

*Primary Examiner* — Nathan S Taylor
(74) *Attorney, Agent, or Firm* — Cantor Colburn LLP

(57) ABSTRACT

An RO indication method and apparatus, an RO determination method and apparatus, a storage medium, a base station and a terminal are provided. The RO indication method includes: determining RO configuration information which includes at least one of followings: an association relation between ROs and corresponding frequency resources where the ROs are located respectively, and an association relation between ROs and corresponding available preambles; and transmitting the RO configuration information to a UE. By the embodiments of the present disclosure, a network is able
(Continued)

RO configuration information is determined, where the RO configuration information includes at least one of followings: an association relation between ROs and corresponding frequency resources where the ROs are located respectively, and an association relation between ROs and corresponding available preambles ⟶ S101 the RO configuration information is transmitted to a UE ⟶ S102 to determine an RO of a UE without considering influence caused by a maximum difference time of RTT and increasing an average waiting time for the UE to transmit a preamble.

18 Claims, 5 Drawing Sheets

(58) Field of Classification Search
CPC ............. H04W 74/0866; H04W 84/06; H04W 72/042; H04W 56/00; H04W 68/02; H04W 74/08; H04W 74/00
See application file for complete search history.

(56) References Cited

U.S. PATENT DOCUMENTS

| | | | |
|---|---|---|---|
| 2017/0202053 A1* | 7/2017 | Rune | H04W 76/25 |
| 2017/0215207 A1 | 7/2017 | Yi et al. | |
| 2018/0376471 A1* | 12/2018 | Chae | H04W 72/048 |
| 2019/0364599 A1* | 11/2019 | Islam | H04L 5/0048 |
| 2020/0052769 A1* | 2/2020 | Cirik | H04L 1/0026 |
| 2020/0059957 A1* | 2/2020 | Pan | H04W 72/1205 |
| 2020/0154326 A1* | 5/2020 | Deenoo | H04W 36/08 |
| 2020/0154377 A1* | 5/2020 | Qian | H04W 72/046 |
| 2020/0221508 A1 | 7/2020 | Huang et al. | |
| 2020/0245200 A1* | 7/2020 | Xiong | H04B 7/0626 |
| 2020/0275479 A1* | 8/2020 | Peisa | H04W 74/0833 |
| 2020/0351853 A1* | 11/2020 | Xiong | H04W 72/044 |
| 2020/0413451 A1* | 12/2020 | Taherzadeh Boroujeni | H04B 7/18519 |
| 2022/0086774 A1* | 3/2022 | Qian | H04B 7/00 |

FOREIGN PATENT DOCUMENTS

| | | |
|---|---|---|
| CN | 106686691 A | 5/2017 |
| CN | 108012329 A | 5/2018 |
| WO | 2014205723 A1 | 12/2014 |
| WO | 2017095095 A1 | 6/2017 |
| WO | 2017131430 A1 | 8/2017 |
| WO | WO-2018182385 A1 * | 10/2018 ........... H04B 7/0408 |
| WO | WO-2018203724 A1 * | 11/2018 ............... H04B 7/00 |

OTHER PUBLICATIONS

Interdigital Inc., "Considerations on Random Access for Non-Terrestrial Networks", 3GPP TSG RAN WG1 Meeting #92, R1-1802632, Feb. 26-Mar. 2, 2018, 4 pages.

Samsung, "Remaining details on PRACH procedure", 3GPP TSG RAN WG1 Meeting 91, R1-1720278, Nov. 27-Dec. 1, 2017, 18 pages.

Spreadtrum Communications, "Msg1-based on-demand SI request", 3GPP TSG RAN WG2#101Bis, R2-1804469, Apr. 16-20, 2018, 5 pages.

3rd Generation Partnership Project, 3GPP TS 36.211, "Physical random access channel", Release 15, V15.2.0 (Dated Jun. 2018) 14 pages.

CNIPA First Office Action for corresponding CN Application No. 201811011433.1, dated Apr. 13, 2021.

ZTE, "Remaining details of RACH procedure", 3rd Generation Partnership Project, 3GPP TSG RAN WG1 Meeting #93 R1-1805945; Busan, Korea, May 21-25, 2018; 15 pages.

International Search Report for international Application No. PCT/CN2019/096464; dated Oct. 14, 2019.

CATT, "Further issues with switching of bandwidth part and random access", 3GPP TSG-RAN WG2 #102, (May 21-25, 2018), R2-1806991; 6 pages.

Ericsson, "Signaling of random access parameters [M063]", 3GPP TSG-RAN WG2 #101, (Feb. 26-Mar. 2, 2018) R2-1803675; 10 pages.

Ericsson, "Text proposal for Random access", 3GPP TSG-RAN WG2 #99bis, (Oct. 9-13, 2017) R2-171143; 6 pages.

Ericsson, "Offline discussion #41: Text proposal for MAC and RRC relating to beam selection during handover", 3GPP TSG-RAN WG2 #99bis, (Oct. 9-13, 2017) R21711994; 4 pages.

CNIPA Second Office Action for corresponding CN Application No. 201811011433.1; dated Sep. 17, 2021.

* cited by examiner

```
┌─────────────────────────────────────────────────────────────┐
│ RO configuration information is received from a network,    │
│ wherein the RO configuration information includes at least  │
│ one of followings: an association relation between ROs and  │ ⟲ S201
│ corresponding frequency resources where the ROs are located │
│ respectively, and an association relation between ROs and   │
│ corresponding available preambles                           │
└─────────────────────────────────────────────────────────────┘
                              │
┌─────────────────────────────────────────────────────────────┐
│ an RO used during random access is determined based on the  │ ⟲ S202
│ RO configuration information                                │
└─────────────────────────────────────────────────────────────┘
```

FIG. 3

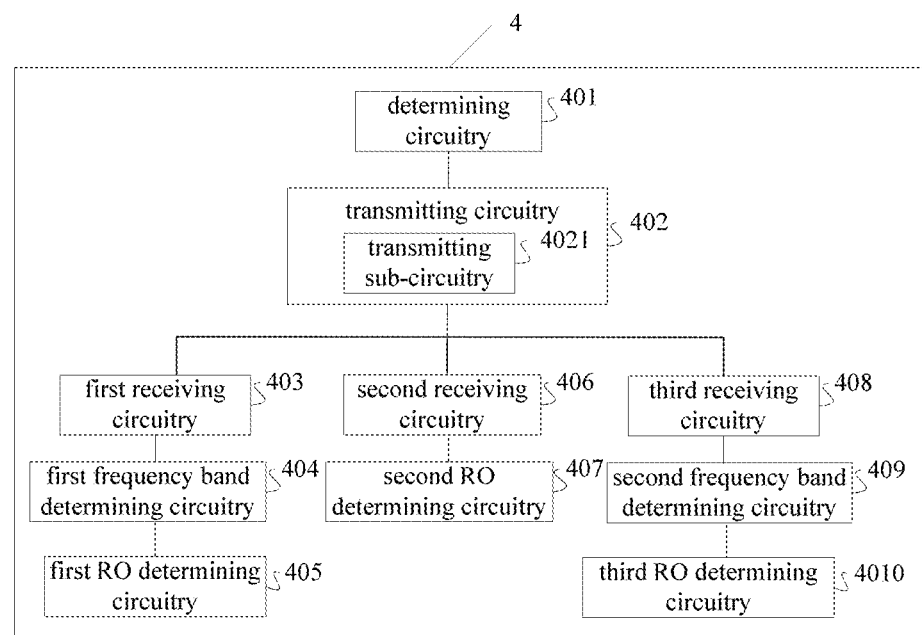

FIG. 4

RANDOM ACCESS OCCASION INDICATION METHOD AND APPARATUS, RANDOM ACCESS OCCASION DETERMINATION METHOD AND APPARATUS, STORAGE MEDIUM, BASE STATION AND TERMINAL

CROSS-REFERENCE TO RELATED APPLICATIONS

This is the U.S. national stage of application No. PCT/CN2019/096464 filed on Jul. 18, 2019. Priority under 35 U.S.C. § 119(a) and 35 U.S.C. § 365(b) is claimed from Chinese Application No. 201811011433.1, filed Aug. 31, 2018, the disclosure of which is also incorporated herein by reference.

TECHNICAL FIELD

The present disclosure generally relates to radio communication technology field, and more particularly, to a Random access Occasion (RO) indication method and apparatus, an RO determination method and apparatus, a storage medium, a base station and a terminal.

BACKGROUND

The 3rd Generation Partnership Project (3GPP) is studying Non Terrestrial Network (NTN) in the Fifth-Generation mobile communications (5G) New Radio (NR). A research scope of 5G NTN mainly includes Spaceborne vehicles, such as Geostationary Earth Orbit Satellites (GEO), Medium Earth Orbit Satellites (MEO) and Low Earth Orbit Satellites (LEO), and airborne vehicle High Altitude Platforms (HAPS). A main feature of NTN lies in that its Round Trip Time (RTT) is relatively long, generally ranging from a few milliseconds (ms for short) to hundreds of milliseconds. One-way delays of different NTN deployment scenarios are shown in Table 1. An RTT is twice the one-way delay. Further, Table 1 also lists relevant parameters of terrestrial network cellular communication with a radius of 10 kilometers (km for short).

TABLE 1

| | deployment-D1 | deployment-D2 | deployment-D3 | deployment-D4 | deployment-D5 | cellular (radius of 10 km) |
|---|---|---|---|---|---|---|
| platform track altitude | GEO located at 35786 km | GEO located at 35786 km | Non GEO located below 600 km | Non GEO located below 600 km | airborne vehicle located above 20 km | |
| frequency band | Ka frequency band | S frequency band | S frequency band | Ka frequency band | S frequency band (lower than 6 GHz) | S frequency band |
| maximum one-way delay (ms) | bent-pipe: 272.37 spaceborne gNB: 135.28 | 272.37 | 14.204 | 14.204 | 1.526 | 0.03333 |
| maximum delay difference (ms) | 16 (satellite covers from edge to center point) | 16 (satellite covers from edge to center point) | 4.44 (satellite covers from edge to center point) | 4.44 (satellite covers from edge to center point) | 0.697 (satellite covers from edge to center point) | 0.00333 (cell center to edge) equals to the maximum delay |

Currently, ROs in existing techniques are designed for a terrestrial network with a relatively short RTT. If in NTN communication a User Equipment (UE) directly initiates a random access request based on an existing RO, in some cases, a base station on a network side cannot identify different ROs due to an RTT duration of the NTN communication, and hardly calculates Timing Advance (TA) and Random Access-Radio Network Temporary Identifier (RA-RNTI).

Therefore, the RO in the NTN communication needs further study.

SUMMARY

Embodiments of the present disclosure provide solutions for identifying different ROs, so that a network does not need to consider influence caused by a maximum difference time of RTT, and an average waiting time for the UE to transmit a preamble may be avoided.

In an embodiment of the present disclosure, an RO indication method is provided, including: determining RO configuration information which includes at least one of followings: an association relation between ROs and corresponding frequency resources where the ROs are located respectively, and an association relation between ROs and corresponding available preambles; and transmitting the RO configuration information to a UE.

Optionally, the RO configuration information includes the association relation between ROs and corresponding frequency resources where the ROs are located respectively, and after transmitting the RO configuration information to the UE, the method further includes: receiving a preamble from the UE on a random access window and a frequency resource in which the preamble is expected to be received; determining the frequency resource used by the preamble; and determining an RO used by the UE during random access based on the association relation between ROs and corresponding frequency resources where the ROs are located respectively and the frequency resource used by the preamble.

Optionally, the RO configuration information includes the association relation between ROs and corresponding available preambles, and after transmitting the RO configuration information to the UE, the method further includes: receiving a preamble from the UE; and determining an RO used by the UE during random access based on the association relation between ROs and corresponding available preambles.

Optionally, the RO configuration information includes the association relation between ROs and corresponding frequency resources where the ROs are located respectively, and the association relation between ROs and corresponding available preambles, and after transmitting the RO configuration information to the UE, the method further includes: receiving a preamble from the UE on a random access window and a frequency resource in which the preamble is expected to be received; determining the frequency resource used by the preamble; and determining an RO used by the UE during random access based on the association relation between ROs and corresponding frequency resources where the ROs are located respectively and the association relation between ROs and corresponding available preambles.

Optionally, transmitting the RO configuration information to the UE includes: transmitting the RO configuration information to the UE through a system information block.

Optionally, there are a plurality of ROs in a target time interval, and the target time interval is a maximum difference time of a round trip time between each UE in a cell and a satellite.

In an embodiment of the present disclosure, an RO determination method is provided, including: receiving RO configuration information from a network, wherein the RO configuration information includes at least one of followings: an association relation between ROs and corresponding frequency resources where the ROs are located respectively, and an association relation between ROs and corresponding available preambles; and determining an RO used during random access based on the RO configuration information.

Optionally, the RO configuration information includes the association relation between ROs and corresponding frequency resources where the ROs are located respectively, and determining an RO used during random access based on the RO configuration information includes: determining a preamble and a frequency resource for the random access; and determining the RO based on the determined frequency resource and the association relation between ROs and corresponding frequency resources where the ROs are located respectively.

Optionally, the method further includes transmitting the preamble based on the RO on the determined frequency resource.

Optionally, the RO configuration information includes the association relation between ROs and corresponding available preambles, and determining an RO used during random access based on the RO configuration information includes: determining a preamble for the random access; and determining the RO based on the determined preamble and the association relation between ROs and corresponding available preambles.

Optionally, the method further includes transmitting the preamble based on the RO.

Optionally, the RO configuration information includes the association relation between ROs and corresponding frequency resources where the ROs are located respectively, and the association relation between ROs and corresponding available preambles, and determining an RO used during random access based on the RO configuration information includes: determining a preamble and a frequency resource for the random access; and determining the RO based on the determined preamble and frequency resource, the association relation between ROs and corresponding available preambles, and the association relation between ROs and corresponding frequency resources where the ROs are located respectively.

Optionally, the method further includes transmitting the preamble based on the RO on the determined frequency resource.

Optionally, receiving RO configuration information from a network includes: receiving the RO configuration information from the network through the system information block.

Optionally, there are a plurality of ROs in a target time interval, and the target time interval is a maximum difference time of a round trip time between each UE in a cell and a satellite.

In an embodiment of the present disclosure, an RO indication apparatus is provided, including: a determining circuitry configured to determine RO configuration information which includes at least one of followings: an association relation between ROs and corresponding frequency resources where the ROs are located respectively, and an association relation between ROs and corresponding available preambles; and a transmitting circuitry configured to transmit the RO configuration information to a UE.

In an embodiment of the present disclosure, an RO determination apparatus is provided, including: a receiving circuitry configured to receive RO configuration information from a network, wherein the RO configuration information includes at least one of followings: an association relation between ROs and corresponding frequency resources where the ROs are located respectively, and an association relation between ROs and corresponding available preambles; and a determining circuitry configured to determine an RO used during random access based on the RO configuration information.

In an embodiment of the present disclosure, a storage medium having computer instructions stored therein is provided, wherein when the computer instructions are executed, the above RO indication method or the above RO determination method is performed.

In an embodiment of the present disclosure, a base station including a memory and a processor is provided, wherein the memory has computer instructions stored therein, and when the processor executes the computer instructions, the above RO indication method is performed.

In an embodiment of the present disclosure, a terminal including a memory and a processor is provided, wherein the memory has computer instructions stored therein, and when the processor executes the computer instructions, the above RO determination method is performed.

Embodiments of the present disclosure may provide following advantages.

In an embodiment of the present disclosure, an RO indication method is provided, including: determining RO configuration information which includes at least one of followings: an association relation between ROs and corresponding frequency resources where the ROs are located respectively, and an association relation between ROs and corresponding available preambles; and transmitting the RO configuration information to a UE. By the embodiment of the present disclosure, even if a time interval between two consecutive ROs configured by the network for the UE in a time domain is less than the maximum difference time of RTT, the network may still determine each RO. Further, the UE may perform random access at the configured RO without increasing an average waiting time for the UE to transmit the preamble.

Further, if the RO configuration information includes the association relation between ROs and corresponding frequency resources where the ROs are located respectively, after transmitting the RO configuration information to the UE, the method further includes: receiving a preamble from the UE on a random access window and a frequency resource in which the preamble is expected to be received; determining the frequency resource used by the preamble; and determining an RO used by the UE during random access based on the association relation between ROs and corresponding frequency resources where the ROs are located respectively and the frequency resource used by the preamble. By the embodiment of the present disclosure, after receiving the preamble from the UE, the network may determine the RO based on the frequency resource used by the preamble and the association relation, and further calculate TA and RA-RNTI.

BRIEF DESCRIPTION OF THE DRAWINGS

FIG. 3 is a flow chart of an RO determination method according to an embodiment;

FIG. 4 is a structural diagram of an RO indication apparatus according to an embodiment;

DETAILED DESCRIPTION

As described in the background, if a UE in NTN communication directly initiates a random access request based on an existing RO, a network cannot calculate TA and RA-RNTI as being incapable of identifying different ROs. If a time interval between two consecutive ROs is increased, an average waiting time for the UE to perform random access may increase although different ROs can be identified.

Specifically, for each RO, a base station (for example, gNodeB, gNB for short) on a base station side needs a preamble detection reception time window with a size which rounds up a maximum RTT difference of a cell edge and a cell center. In terrestrial networks where an RTT duration difference is relatively short, the preamble detection reception time window is 1 to 2 RO durations which greatly exceed the time interval between adjacent ROs. Therefore, the preamble detection reception time windows on the base station side do not overlap with each other. An RO of the UE transmitting the preamble can be uniquely determined based on the preamble detection reception time window, so that RA-RNTI corresponding to the UE is acquired and TA is calculated.

For NTN communication, an RTT duration difference of a cell edge and a cell center in the NTN communication is relatively large. If configuration of terrestrial networks is adopted, preamble detection reception time windows at a base station side corresponding to two adjacent ROs may overlap with each other. When receiving one preamble, the base station cannot uniquely determine the RO transmitting the preamble by the UE, and thus cannot acquire RA-RNTI corresponding to the UE, and cannot calculate TA.

Figure 1:
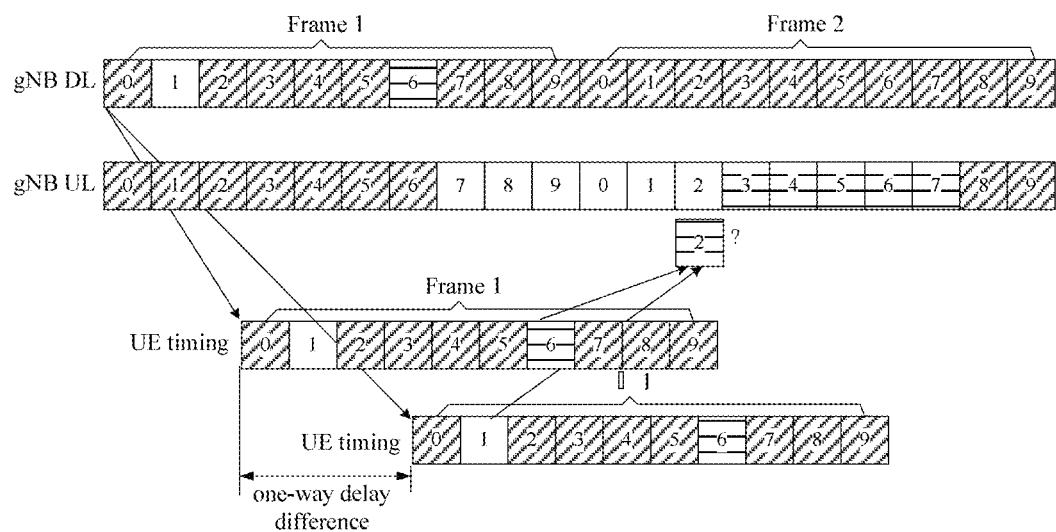
FIG. 1 is a diagram of a random access procedure performed when an interval between two consecutive ROs is less than a maximum difference time of RTT in existing techniques.

Take subcarrier spacing of 15 kHz as an example. As shown in FIG. 1, when a maximum difference of RTT in gNB is greater than or equal to 5 ms, for each Physical Random Access Channel (PRACH) slot, gNB requires a preamble reception window of at least 6 ms. For an RO located in time slot 1 of frame 1, the corresponding preamble reception window of the gNB is from time slot 7 of frame 1 to time slot 2 of frame 2, a total of six time slots in length.

In existing techniques, the network may configure the time interval of two consecutive ROs for the UE to be 5 ms or less. The time interval between two consecutive ROs is 5 ms. For the RO located in time slot 6 of frame 1, the corresponding preamble reception window of the gNB is from time slot 2 of frame 2 to time slot 7 of frame 2, a total of six time slots in length. Therefore, when receiving the preamble in time slot 2 of frame 2, the gNB cannot determine whether the preamble is transmitted by the UE in the RO in time slot 1 of frame 1 or in the RO in time slot 6 of frame 1, and therefore cannot calculate RA-RNTI and TA.

Those skilled in the art could understand that for other subcarier spacing, if the network cannot accurately determine the RO, there is still a problem that the RA-RNTI and TA cannot be calculated.

In view of the problem that the large RTT difference in NTN communication makes it difficult to identify ROs, a simple solution is to increase the time interval between adjacent ROs. However, this method increases a waiting time for the UE to transmit the preamble.

In an embodiment of the present disclosure, an RO indication method is provided, including: determining RO configuration information which includes at least one of followings: an association relation between ROs and corresponding frequency resources where the ROs are located respectively, and an association relation between ROs and corresponding available preambles; and transmitting the RO configuration information to a UE. By the embodiment of the present disclosure, even if a time interval between two consecutive ROs configured by the network for the UE in a time domain is less than the maximum difference time of RTT, the network may still determine each RO.

Further, the UE may perform random access at the configured RO without increasing an average waiting time for the UE to transmit the preamble.

In order to clarify the objects, characteristics and advantages of the disclosure, embodiments of present disclosure will be described in detail in conjunction with accompanying drawings.

Figure 2:
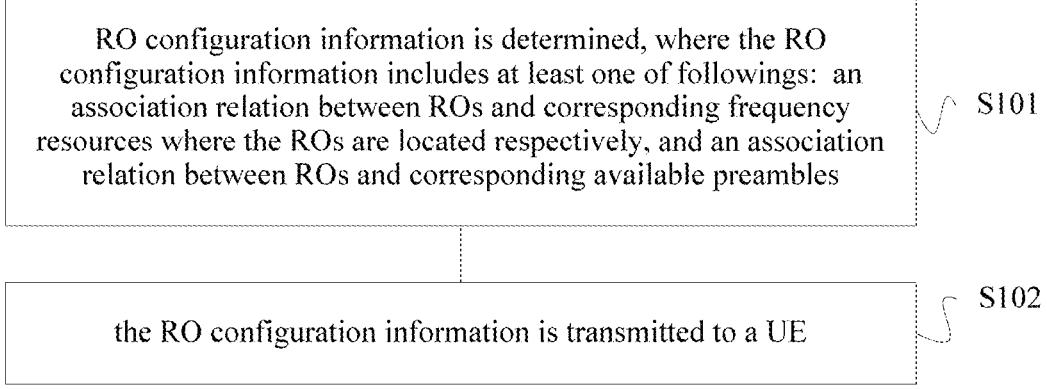
FIG. 2 is a flow chart of an RO indication method according to an embodiment.

FIG. 2 is a flow chart of an RO indication method according to an embodiment. Specifically, the RO indication method may be applied to a network side, for example, performed by a base station on the network side, and may include S101 and S102.

In S101, RO configuration information is determined, where the RO configuration information includes at least one of followings: an association relation between ROs and corresponding frequency resources where the ROs are located respectively, and an association relation between ROs and corresponding available preambles.

In S102, the RO configuration information is transmitted to a UE.

In some embodiments, the base station (for example, gNB) on the network side determines a maximum difference time of RTT between each UE in a cell and a satellite. If the maximum difference time is determined as a target time interval, the base station may configure multiple ROs for the target time interval.

Further, when the target time interval is configured with multiple ROs, the base station may configure RO configuration information for the UE so as to identify multiple ROs within the target time interval.

In some embodiments, the RO configuration information includes at least one of followings: an association relation between ROs and corresponding frequency resources where the ROs are located respectively, and an association relation between ROs and corresponding available preambles.

In some embodiments, the association relation between ROs and corresponding frequency resources where the ROs are located respectively may include an association relation between a single RO and a frequency resource where the RO is located, or an association relation between a single RO and multiple frequency resources where the RO is located. If the RO and its frequency resource have a one-to-one association relation, the UE may transmit a preamble at the RO and its frequency resource. If the RO and its frequency resources have a one-to-multi association relation, the UE may randomly select a frequency resource from the multiple frequency resources, and transmit a preamble at the RO and the selected frequency resource.

In some embodiments, if a single RO has an association relation with multiple frequency resources, the multiple frequency resources may be determined as a frequency resource set (i.e., the frequency resource set includes the multiple frequency resources), and accordingly the association relation between the single RO and the multiple frequency resources may be equivalent to an association relation between the single RO and the frequency resource set. When a preamble needs to be transmitted, the UE may select a frequency resource from the frequency resource set to transmit the preamble.

Alternatively, the association relation between ROs and corresponding available preambles includes an association relation between a single RO and one available preamble, or an association relation between a single RO and multiple available preambles.

In some embodiments, if a single RO has an association relation with multiple preambles, the multiple preambles may be determined as a preamble set (i.e., the preamble set includes the multiple preambles), and accordingly the association relation between the single RO and the multiple available preambles may be equivalent to an association relation between the single RO and the preamble set.

In S102, the base station may transmit the RO configuration information to the UE, so that the UE can determine an RO based on the RO configuration information. In some embodiments, the base station may transmit the RO configuration information to the UE through a System Information Block (SIB).

Further, after receiving the RO configuration information, the UE may acquire the association relation between the ROs and the frequency resources, or the association relation between the ROs and the preambles, or both the association relation between the ROs and the frequency resources and the association relation between the ROs and the preambles.

Further, when performing random access, the UE may determine the RO used for random access based on the RO configuration information.

In some embodiments, when the RO configuration information includes the association relation between ROs and corresponding frequency resources where the ROs are located respectively, the UE may first determine the preamble for performing random access and the frequency resource used by the preamble, and then determine the RO based on the used frequency resource and the association relation between the RO and the frequency resource. Afterward, when a time slot corresponding to the RO arrives, the UE may transmit the preamble for performing random access on the frequency resource used by the preamble.

Further, the base station may receive a preamble from the UE on a random access window and a frequency resource in which the preamble is expected to be received, determine the frequency resource used by the preamble, and determine an RO used by the UE during random access based on the association relation between ROs and corresponding frequency resources where the ROs are located respectively and the frequency resource used by the preamble.

In some embodiments, if the RO has an association relation with multiple frequency resources (for example, the RO has an association relation with a frequency resource set), the UE may select a frequency resource from the frequency resource set as the frequency resource used by the preamble, and then determine the RO based on the used frequency resource and the association relation between the RO and the frequency resource set where the used frequency resource is located. Afterward, when a time slot corresponding to the RO arrives, the UE may transmit the preamble for performing random access on the frequency resource used by the preamble.

Further, when receiving the preamble, the base station may determine the frequency resource used by the preamble, and determine the RO used when the UE performs random access based on the association relation between the ROs and the frequency resource set where the used frequency resource is located and the frequency resource used by the preamble.

As a specific embodiment, still taking FIG. 1 as an example, when receiving a preamble in slot 22, the base station may determine a PRACH time slot for the UE to transmit the preamble (that is, the time slot corresponding to the RO) based on a frequency resource used by the preamble.

Alternatively, when the RO configuration information includes the association relation between ROs and corresponding available preambles, the UE may determine a preamble for performing random access, and determine the RO based on the determined preamble and the association relation between the ROs and corresponding available preambles. Afterward, when a time slot corresponding to the RO arrives, the UE may transmit the preamble for performing random access in the determined RO.

Further, the base station may receive the preamble from the UE; and determine the RO when the UE performs random access based on the association relation between the ROs and corresponding available preambles.

In some embodiments, if the RO has an association relation with multiple preambles (i.e., the RO has an association relation with a preamble set), the UE may first randomly select an available preamble from the preamble set, and determine the selected preamble as the preamble for random access. Afterward, the RO is determined based on the determined preamble and the association relation between the ROs and corresponding available preambles. When a time slot corresponding to the RO arrives, the UE may transmit the preamble for performing random access in the determined RO.

Further, the base station may receive the preamble from the UE, and determine the RO used by the UE during random access based on the association relation between the RO and the preamble set where the preamble is located.

In some embodiments, still taking FIG. 1 as an example, when receiving a preamble in slot 22, the base station determines an RPACH for the UE to transmit the preamble (that is, a time slot corresponding to RO) based on the association relation between the preamble or the preamble set where the preamble is located and the RO.

Alternatively, when the RO configuration information includes the association relation between ROs and corresponding frequency resources where the ROs are located respectively and the association relation between the ROs and the corresponding available preambles, the UE may first determine a preamble for performing random access and a frequency resource for transmitting the preamble, and then determine an RO based on the determined preamble and frequency resource, the association relation between the ROs and the corresponding available preambles, and the association relation between the ROs and corresponding frequency resources where the ROs are located respectively. When a time slot corresponding to the RO arrives, the UE may transmit the preamble for performing random access based on the RO on the determined frequency resource.

Further, the base station may receive a preamble from the UE on a random access window and a frequency resource in which the preamble is expected to be received, determine the frequency resource used by the preamble, and determine an RO used by the UE during random access based on the association relation between ROs and corresponding frequency resources where the ROs are located respectively and the association relation between ROs and corresponding available preambles.

In some embodiments, if RO has an association relation with multiple preambles (i.e., the RO has an association relation with a preamble set), and the RO has an association relation with multiple frequency resources (i.e., the RO has an association relation with a frequency resource set), the UE may first determine the preamble and frequency resource for performing random access, and then determine the RO based on the determined preamble and frequency resource, the association relation between the RO and the preamble, and the association relation between the RO and the frequency resource.

Further, the base station receives the preamble from the UE, determines the frequency resource used by the preamble, and determines the RO used when the UE performs random access based on the association relation between the RO and the frequency resource set where the used frequency resource is located and the association relation between the RO and the preamble set where the preamble is located.

FIG. 3 is a flow chart of an RO determination method according to an embodiment. Specifically, the RO determination method may be applied to a UE side, for example, performed by a 5G UE, and may include S201 and S202.

In S201, RO configuration information is received from a network, where the RO configuration information includes at least one of followings: an association relation between ROs and corresponding frequency resources where the ROs are located respectively, and an association relation between ROs and corresponding available preambles.

In S202, an RO used during random access is determined based on the RO configuration information.

In some embodiments, in S201, the UE may receive RO configuration information from a network, where the RO configuration information includes at least one of followings: an association relation between ROs and corresponding frequency resources where the ROs are located respectively, and an association relation between ROs and corresponding available preambles. The frequency resource refers to a frequency resource that can be used by the UE to transmit a preamble when performing random access. Each RO has a one-to-one correspondence with the frequency resource where the RO is located, or each RO may have a one-to-multi correspondence with multiple frequency resources. In some embodiments, the UE may receive the RO configuration information by receiving SIB from the network.

In S202, when the RO configuration information includes the association relation between ROs and corresponding frequency resources where the ROs are located respectively, the UE may determine a preamble and a frequency resource for the random access, determine the RO based on the determined frequency resource and the association relation between ROs and corresponding frequency resources where the ROs are located respectively, and transmit the preamble based on the RO on the determined frequency resource. The network determines the RO used by the UE to perform random access based on the preamble, the frequency resource used by the preamble, and the association relation between ROs and frequency resources.

Alternatively, when the RO configuration information includes the association relation between ROs and corresponding available preambles, the UE may determine a preamble for the random access, determine the RO based on the determined preamble and the association relation between ROs and corresponding available preambles, and transmit the preamble based on the RO. The network determines the RO used by the UE to perform random access based on the preamble, and the association relation between ROs and preambles.

Alternatively, when the RO configuration information includes the association relation between ROs and corresponding frequency resources where the ROs are located respectively, and the association relation between ROs and corresponding available preambles, the UE may determine a preamble and a frequency resource for the random access, determine the RO based on the determined preamble and frequency resource, the association relation between ROs and corresponding available preambles, and the association relation between ROs and corresponding frequency resources where the ROs are located respectively, and transmit the preamble based on the RO on the determined frequency resource. The network receives the preamble from the UE, determines the frequency resource used by the preamble, and determines the RO used by the UE to perform random access based on the association relation between ROs and frequency resources and the association relation between ROs and preambles.

In some embodiments, there are a plurality of ROs in a target time interval, and the target time interval is a maximum difference time of a round trip time between each UE in a cell and a satellite.

Those skilled in the art could understand that S201 to S202 can be regarded as steps corresponding to S101 to S102 in the embodiment as shown in FIG. 2, and the two are complementary to each other in terms of specific implementation principles and logic. Therefore, the RO determination method on the UE side and terminologies may be referred to related descriptions of the embodiment as shown in FIG. 2, and are not described in detail here.

From above, with the technical solutions provided by the embodiments of the present disclosure, even if a RTT difference time between each UE and a satellite in NTN communication is relatively large, the network may still be capable of determining each RO. Therefore, RO configuration in a time domain is not limited to the maximum RTT difference time, and the UE does not need to increase a waiting time for transmitting a preamble.

FIG. 4 is a structural diagram of an RO indication apparatus according to an embodiment. The RO indication apparatus 4 may be applied to a network side, for example, at a base station, and may be used to implement technical solutions of the RO indication method as shown in FIG. 2.

Specifically, the RO indication apparatus 4 may include a determining circuitry 401 and a transmitting circuitry 402.

In some embodiments, the determining circuitry 401 is configured to determine RO configuration information which includes at least one of followings: an association relation between ROs and corresponding frequency resources where the ROs are located respectively, and an association relation between ROs and corresponding available preambles, and the transmitting circuitry 402 is configured to transmit the RO configuration information to a UE.

In some embodiments, the RO configuration information includes the association relation between ROs and corresponding frequency resources where the ROs are located respectively, and the RO indication apparatus 4 may further include a first receiving circuitry 403, a first frequency band determining circuitry 404 and a first RO determining circuitry 405.

In some embodiments, the first receiving circuitry 403 is configured to: after the RO configuration information is transmitted to the UE, receive a preamble from the UE on a random access window and a frequency resource in which the preamble is expected to be received, the first frequency band determining circuitry 404 is configured to determine the frequency resource used by the preamble, and the first RO determining circuitry 405 is configured to determine an RO used by the UE during random access based on the association relation between ROs and corresponding frequency resources where the ROs are located respectively and the frequency resource used by the preamble.

Alternatively, the RO configuration information includes the association relation between ROs and corresponding available preambles, and the RO indication apparatus 4 may further include a second receiving circuitry 406 and a second RO determining circuitry 407.

In some embodiments, the second receiving circuitry 406 is configured to: after the RO configuration information is transmitted to the UE, receive a preamble from the UE, and the second RO determining circuitry 407 is configured to determine an RO used by the UE during random access based on the association relation between ROs and corresponding available preambles.

Alternatively, the RO configuration information includes the association relation between ROs and corresponding frequency resources where the ROs are located respectively, and the association relation between ROs and corresponding available preambles, and the RO indication apparatus 4 may further include a third receiving circuitry 408, a second frequency band determining circuitry 409 and a third RO determining circuitry 4010.

In some embodiments, the third receiving circuitry 408 is configured to: after the RO configuration information is transmitted to the UE, receive a preamble from the UE on a random access window and a frequency resource in which the preamble is expected to be received, the second frequency band determining circuitry 409 is configured to determine the frequency resource used by the preamble, and the third RO determining circuitry 4010 is configured to determine an RO used by the UE during random access based on the association relation between ROs and corresponding frequency resources where the ROs are located respectively and the association relation between ROs and corresponding available preambles.

In some embodiments, the transmitting circuitry 402 includes a transmitting sub-circuitry 4021 configured to transmit the RO configuration information to the UE through a system information block.

In some embodiments, there are a plurality of ROs in a target time interval, and the target time interval is a maximum difference time of a round trip time between each UE in a cell and a satellite.

More details of working principles and working modes of the RO indication apparatus 4 can be found in the above descriptions of FIG. 2, and are not described here.

Figure 5:
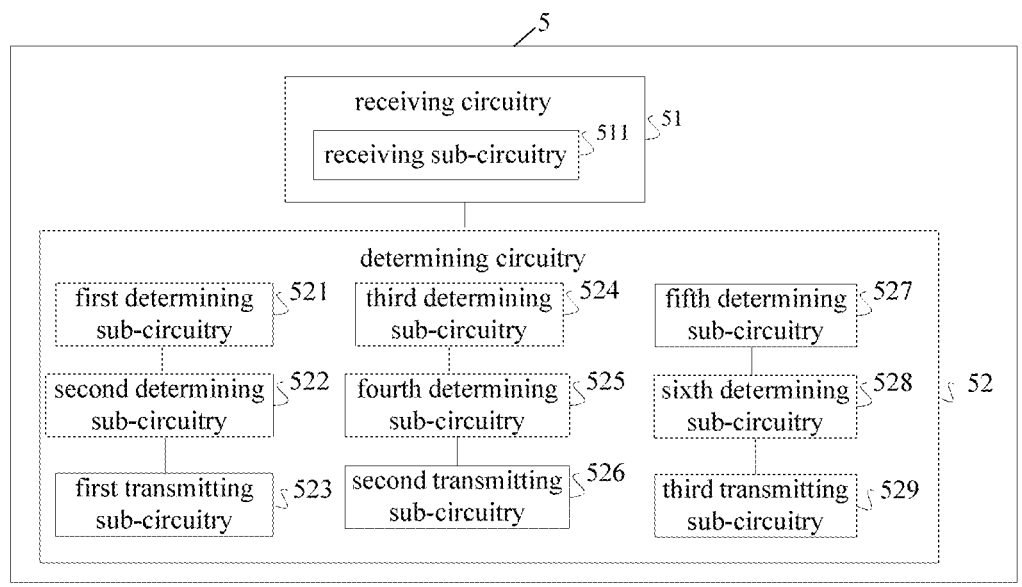
FIG. 5 is a structural diagram of an RO determination apparatus according to an embodiment.

FIG. 5 is a structural diagram of an RO determination apparatus according to an embodiment. The RO determination apparatus 5 may be applied to a UE side, and may be used to implement technical solutions of the RO determination method as shown in FIG. 3.

Specifically, the RO determination apparatus 5 may include a receiving circuitry 51 and a determining circuitry 52.

The receiving circuitry 51 is configured to receive RO configuration information from a network, wherein the RO configuration information includes at least one of followings: an association relation between ROs and corresponding frequency resources where the ROs are located respectively, and an association relation between ROs and corresponding available preambles, and the determining circuitry 52 is configured to determine an RO used during random access based on the RO configuration information.

In some embodiments, the RO configuration information includes the association relation between ROs and corresponding frequency resources where the ROs are located respectively, and the determining circuitry 52 includes: a first determining sub-circuitry 521 configured to determine a preamble and a frequency resource for the random access; and a second determining sub-circuitry 522 configured to determine the RO based on the determined frequency resource and the association relation between ROs and corresponding frequency resources where the ROs are located respectively.

In some embodiments, the determining circuitry 52 further includes a first transmitting sub-circuitry 523 configured to transmit the preamble based on the RO on the determined frequency resource.

Alternatively, the RO configuration information includes the association relation between ROs and corresponding available preambles, and the determining circuitry 52 includes: a third determining sub-circuitry 524 configured to determine a preamble for the random access; and a fourth determining sub-circuitry 525 configured to determine the RO based on the determined preamble and the association relation between ROs and corresponding available preambles.

In some embodiments, the determining circuitry 52 further includes a second transmitting sub-circuitry 526 configured to transmit the preamble based on the RO on the determined frequency resource.

Alternatively, the RO configuration information includes the association relation between ROs and corresponding frequency resources where the ROs are located respectively, and the association relation between ROs and corresponding available preambles, and the determining circuitry 52 includes: a fifth determining sub-circuitry 527 configured to determine a preamble and a frequency resource for the random access; and a sixth determining sub-circuitry 528 configured to determine the RO based on the determined preamble and frequency resource, the association relation between ROs and corresponding available preambles, and the association relation between ROs and corresponding frequency resources where the ROs are located respectively.

In some embodiments, the determining circuitry 52 further includes a third transmitting sub-circuitry 529 configured to transmit the preamble based on the RO on the determined frequency resource.

In some embodiments, the receiving circuitry 51 may include a receiving sub-circuitry 511 configured to receive the RO configuration information from the network through the system information block.

In some embodiments, there are a plurality of ROs in a target time interval, and the target time interval is a maximum difference time of a round trip time between each UE in a cell and a satellite.

More details of working principles and working modes of the RO determination apparatus 5 can be found in the above descriptions of FIG. 3, and are not described here.

Signaling interaction between a UE and a network (for example, an NR base station) adopting the embodiments of the present disclosure is further described below in conjunction with typical application scenarios.

Figure 6:
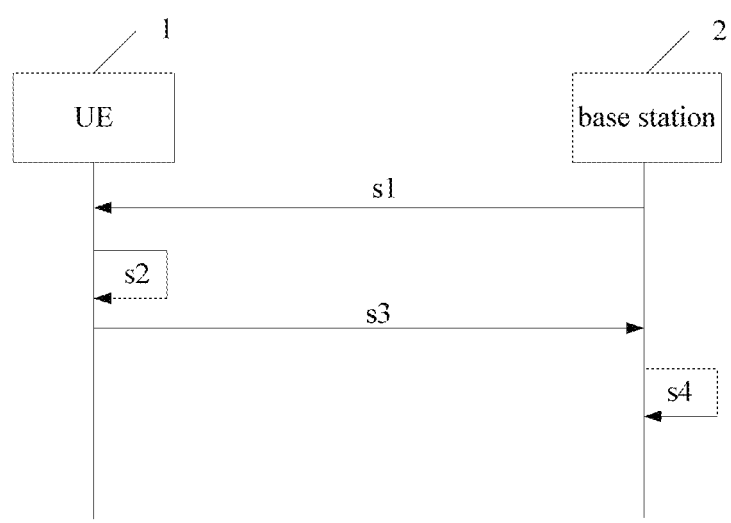
FIG. 6 is a signaling interaction diagram of a typical application scenario.

In a typical application scenario, referring to FIG. 6, after a UE 1 resides in a base station 2 in the network, the base station 2 may first perform s1, that is, transmitting RO configuration information to the UE 1 through a system information block, where the RO configuration information may include at least one of followings: an association relation between ROs and corresponding frequency resources where the ROs are located respectively, and an association relation between ROs and corresponding available preambles.

Afterward, the UE 1 may perform s2, that is, when the RO configuration information includes the association relation between ROs and corresponding frequency resources where the ROs are located respectively, determining a preamble and a frequency resource for performing random access, and determining an RO based on the determined frequency resource and the association relation between ROs and corresponding frequency resources where the ROs are located respectively.

Afterward, the UE 1 may perform s3, that is, transmitting the preamble based on the RO on the determined frequency resource.

Afterward, the base station 2 may perform s4, that is, determining the RO used by the UE 1 during random access based on the received preamble and the association relation between ROs and corresponding frequency resources where the ROs are located respectively.

Figure 7:
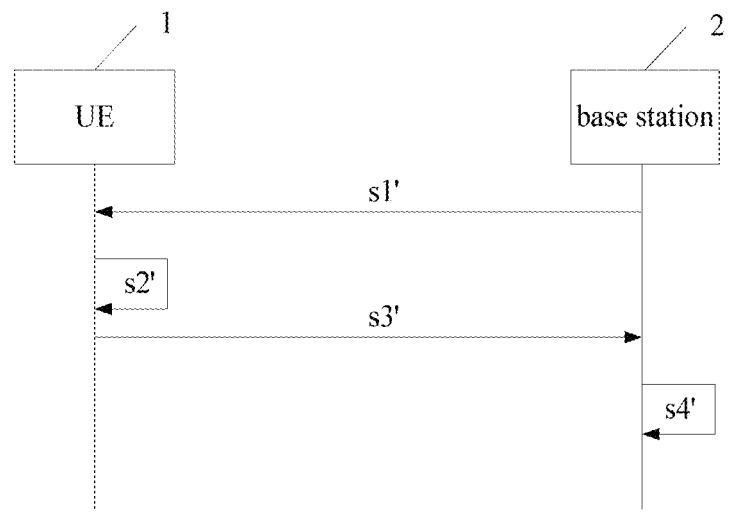
FIG. 7 is a signaling interaction diagram of a typical application scenario.

In another typical application scenario, referring to FIG. 7, after a UE 1 resides in a base station 2 in the network, base station 2 may first perform s1', that is, transmitting RO configuration information to the UE 1 through a system information block, where the RO configuration information may include at least one of followings: an association relation between ROs and corresponding frequency resources where the ROs are located respectively, and an association relation between ROs and corresponding available preambles.

Afterward, the UE 1 may perform s2', that is, when the RO configuration information includes the association relation between ROs and corresponding available preambles, determining a preamble for performing random access, and determining an RO based on the determined preamble and the association relation between ROs and corresponding available preambles.

Afterward, the UE 1 may perform s3', that is, transmitting the preamble based on the determined RO.

Afterward, the base station 2 may perform s4', that is, determining the RO used by the UE 1 during random access based on the received preamble and the association relation between ROs and corresponding available preambles.

Figure 8:
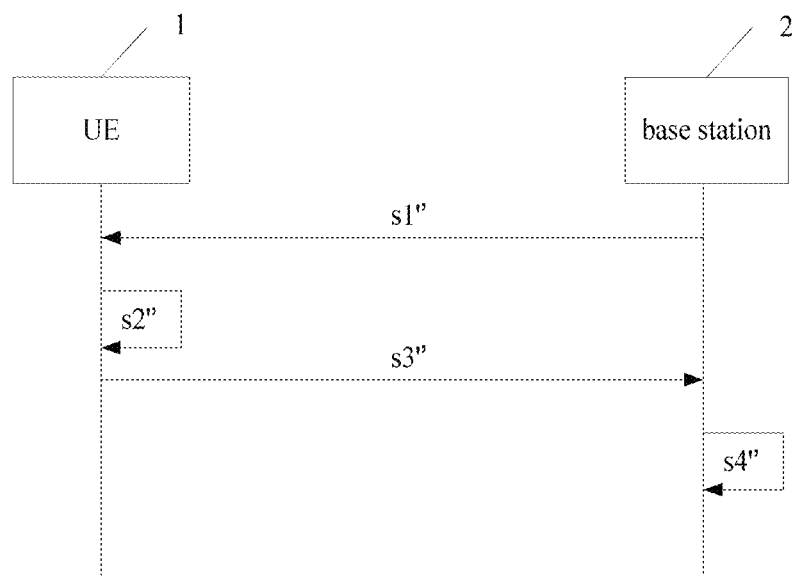
FIG. 8 is a signaling interaction diagram of a typical application scenario.

In another typical application scenario, referring to FIG. 8, after a UE 1 resides in a base station 2 in the network, the base station 2 may first perform operation s1", that is, transmitting RO configuration information to the UE 1 through a system information block, where the RO configuration information may include at least one of followings: an association relation between ROs and corresponding frequency resources where the ROs are located respectively, and an association relation between ROs and corresponding available preambles.

Afterward, the UE 1 may perform s2", that is, when the RO configuration information includes the association relation between ROs and corresponding frequency resources where the ROs are located respectively, and the association relation between ROs and corresponding available preambles, determining a preamble and a frequency resource for performing random access, and determining an RO based on the determined preamble and frequency resource, the association relation between ROs and corresponding frequency resources where the ROs are located respectively, and the association relation between ROs and corresponding available preambles.

Afterward, the UE 1 may perform s3", that is, transmitting the preamble based on the RO on the determined frequency resource.

Afterward, the base station 2 may perform s4", that is, the network determines the RO used by the UE 1 during random access based on the received preamble, the association relation between ROs and corresponding frequency resources where the ROs are located respectively, and the association relation between ROs and corresponding available preambles.

More details of working principles and working modes of the UE 1 and the base station 2 in the application scenarios as shown in FIG. 6, FIG. 7 and FIG. 8 can be found in the above descriptions of FIG. 2 and FIG. 3, and are not described here.

In an embodiment of the present disclosure, a storage medium having computer instructions stored therein is provided, wherein when the computer instructions are executed, the above RO indication method as shown in FIG. 2 and the above RO determination method as shown in FIG. 3 are performed. In some embodiments, the storage medium may include a computer readable storage medium, such as a non-valatile memory or a non-transitory memory. The computer readable storage medium may include a Read Only Memory (ROM), a Random Access Memory (RAM), a magnetic disk or an optical disk.

In an embodiment of the present disclosure, a base station including a memory and a processor is provided, wherein the memory has computer instructions stored therein, and when the processor executes the computer instructions, the above RO indication method as shown in FIG. 2 is performed. In some embodiments, the base station may be an NR base station (such as gNB).

In an embodiment of the present disclosure, a terminal including a memory and a processor is provided, wherein the memory has computer instructions stored therein, and when the processor executes the computer instructions, the above RO determination method as shown in FIG. 3 is performed. In some embodiments, the terminal may be a UE, such as an NR UE.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Random access Occasion (RO) indication method, comprising:
    determining RO configuration information which comprises at least one of followings: an association relation between ROs and corresponding frequency resources where the ROs are located respectively, and an association relation between ROs and corresponding available preambles; and
    transmitting the RO configuration information to a User Equipment (UE),
    wherein there are a plurality of ROs in a target time interval, and the target time interval is a maximum difference time of a round trip time between each UE in a cell and a satellite.

2. The method according to claim 1, wherein the RO configuration information comprises the association relation between ROs and corresponding frequency resources where the ROs are located respectively, and after transmitting the RO configuration information to the UE, the method further comprises:
    receiving a preamble from the UE on a random access window and a frequency resource in which the preamble is expected to be received;
    determining the frequency resource used by the preamble; and
    determining an RO used by the UE during random access based on the association relation between ROs and corresponding frequency resources where the ROs are located respectively and the frequency resource used by the preamble.

3. The method according to claim 1, wherein the RO configuration information comprises the association relation between ROs and corresponding available preambles, and after transmitting the RO configuration information to the UE, the method further comprises:
    receiving a preamble from the UE; and
    determining an RO used by the UE during random access based on the association relation between ROs and corresponding available preambles.

4. The method according to claim 1, wherein the RO configuration information comprises the association relation between ROs and corresponding frequency resources where the ROs are located respectively, and the association relation between ROs and corresponding available preambles, and after transmitting the RO configuration information to the UE, the method further comprises:
    receiving a preamble from the UE on a random access window and a frequency resource in which the preamble is expected to be received;
    determining the frequency resource used by the preamble; and
    determining an RO used by the UE during random access based on the association relation between ROs and corresponding frequency resources where the ROs are located respectively and the association relation between ROs and corresponding available preambles.

5. The method according to claim 1, wherein transmitting the RO configuration information to the UE comprises:
    transmitting the RO configuration information to the UE through a system information block.

6. A non-transitory storage medium having computer instructions stored therein, wherein when the computer instructions are executed, the Random access Occasion (RO) indication method of claim 1 is performed.

7. A base station comprising a memory and a processor, wherein the memory has computer instructions stored therein, and when the processor executes the computer instructions, the Random access Occasion (RO) indication method of claim 1 is performed.

8. A Random access Occasion (RO) determination method, comprising:
    receiving RO configuration information from a network, wherein the RO configuration information comprises at least one of followings: an association relation between ROs and corresponding frequency resources where the ROs are located respectively, and an association relation between ROs and corresponding available preambles; and
    determining an RO used during random access based on the RO configuration information,
    wherein there are a plurality of ROs in a target time interval, and the target time interval is a maximum difference time of a round trip time between each UE in a cell and a satellite.

9. The method according to claim 8, wherein the RO configuration information comprises the association relation between ROs and corresponding frequency resources where the ROs are located respectively, and determining an RO used during random access based on the RO configuration information comprises:
    determining a preamble and a frequency resource for the random access; and
    determining the RO based on the determined frequency resource and the association relation between ROs and corresponding frequency resources where the ROs are located respectively.

10. The method according to claim 9, further comprising:
    transmitting the preamble based on the RO on the determined frequency resource.

11. The method according to claim 8, wherein the RO configuration information comprises the association relation between ROs and corresponding available preambles, and determining an RO used during random access based on the RO configuration information comprises:
    determining a preamble for the random access; and
    determining the RO based on the determined preamble and the association relation between ROs and corresponding available preambles.

12. The method according to claim 11, further comprising:
    transmitting the preamble based on the RO.

13. The method according to claim 8, wherein the RO configuration information comprises the association relation between ROs and corresponding frequency resources where the ROs are located respectively, and the association relation between ROs and corresponding available preambles, and determining an RO used during random access based on the RO configuration information comprises:
    determining a preamble and a frequency resource for the random access; and
    determining the RO based on the determined preamble and frequency resource, the association relation between ROs and corresponding available preambles, and the association relation between ROs and corresponding frequency resources where the ROs are located respectively.

14. The method according to claim 13, further comprising:
   transmitting the preamble based on the RO on the determined frequency resource.

15. The method according to claim 8, wherein receiving RO configuration information from a network comprises:
   receiving the RO configuration information from the network through the system information block.

16. A terminal comprising a memory and a processor, wherein the memory has computer instructions stored therein, and when the processor executes the computer instructions, the Random access Occasion (RO) determination method of claim 8 is performed.

17. A non-transitory storage medium having computer instructions stored therein, wherein when the computer instructions are executed, the Random access Occasion (RO) determination method of claim 8 is performed.

18. A Random access Occasion (RO) determination apparatus, comprising:
   a receiving circuitry configured to receive RO configuration information from a network, wherein the RO configuration information comprises at least one of followings: an association relation between ROs and corresponding frequency resources where the ROs are located respectively, and an association relation between ROs and corresponding available preambles; and
   a determining circuitry configured to determine an RO used during random access based on the RO configuration information,
   wherein there are a plurality of ROs in a target time interval, and the target time interval is a maximum difference time of a round trip time between each UE in a cell and a satellite.

* * * * *